Oct. 15, 1968   D. McCORMACK PETERSON   3,405,624

PHOTOGRAPHIC SHUTTER

Filed May 18, 1966

DEAN M. PETERSON
INVENTOR.

BY Robert W Hampton
Malcolm H Dunn
ATTORNEYS

3,405,624
PHOTOGRAPHIC SHUTTER
Dean McCormack Peterson, Rochester, N.Y., assignor to Eastman Kodak Company, Rochester, N.Y., a corporation of New Jersey
Filed May 18, 1966, Ser. No. 551,053
5 Claims. (Cl. 95—59)

The present invention relates to photography and particularly to shutters for photographic cameras.

The present invention is directed to the type of shutter known as an impact shutter, an example of which is disclosed in U.S. Patent No. 3,033,092 issued Apr. 21, 1960. This type of shutter commonly employs a pivoted single blade and is characterized by the method in which the shutter blade is moved from its normally closed position, in which it covers the exposure aperture of the camera objective, to its open position. This method consists of striking the blade with a high-speed impact member, thus causing it to rotate about its pivot point to its open position whereby the lens aperture is uncovered. The blade then strikes an adjustable rebound member which causes the blade to return to its closed position. The period of time during which the shutter blade remains open is determined by the position of the rebound member.

Known impact shutters of the type referred to have been limited to exposure speeds not exceeding 1/250 of a second; have caused the camera to be subjected to an undesirable shock which could induce camera movement during the exposure because a relatively sturdy impact mechanism, and a relatively light shutter blade, has had to be used to obtain these higher shutter speeds.

I have discovered that most of these noted shortcomings of conventional impact shutters are the result of an inefficient transfer of energy from the impact member and/or the rebound member to the shutter blade. I have also discovered that these shortcomings can be overcome or greatly reduced by so arranging the shutter, impact mechanism and/or rebound member so that the force applied to the shutter blade by said impact mechanism and/or rebound member will be directed in such a way as to obtain the most efficient transfer of energy to the shutter blade from these driving members.

The primary object of the present invention is to provide an improvement in impact type shutters, the improvement consisting of providing means for striking the shutter blade at a point so located on the shutter blade that the direction of the force applied will pass through the "center of percussion" of the blade as defined below.

It is a further object of the present invention to provide a shutter of the impact type, having a relatively simple and inexpensive design, but which is capable of achieving shutter speeds up to 1/2000 of a second. Another object of the present invention is to provide a shutter capable of achieving such high speeds while subjecting the camera to a minimum of shock due to the impact of the driving member and/or a rebound member against the shutter blade, hence resulting in less inadvertent camera movement at the time of taking the picture.

A further object of this invention is to provide an impact shutter of simple construction capable of achieving a wide variety of speeds with a minimum of force applied by the impact member, whereby a lighter impact member and/or a heavier and more durable shutter blade may be utilized.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Figure 1:
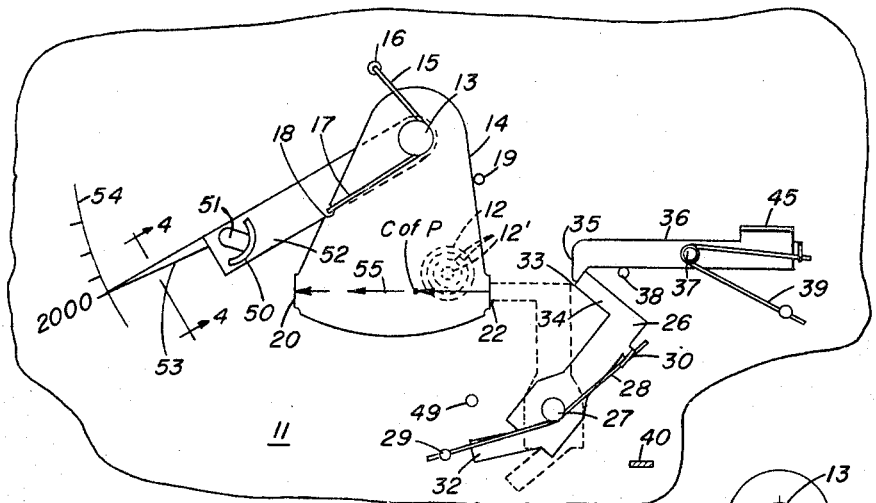
FIGURE 1 represents a plan view of an impact type shutter employing the present invention, the shutter being shown in its normal or closed position and the impact member being in its cocked position.
Figure 3:
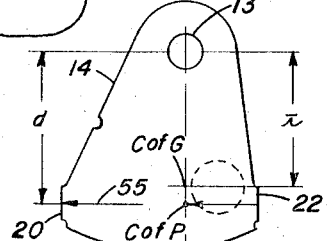
Figure 5:
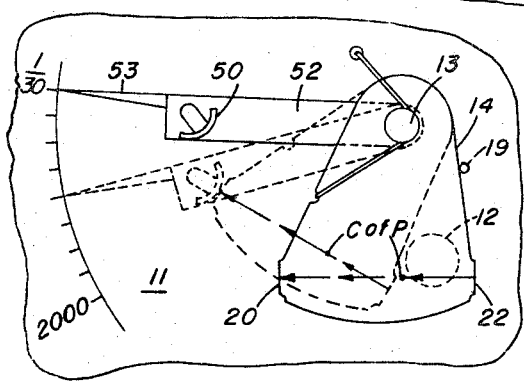
Figure 4:
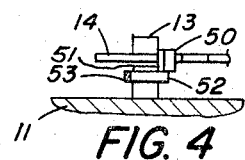

FIGURE 3 discloses a plan view of a typical shutter blade and illustrates various dimensions utilized in the exercise of this invention;

FIGURE 4 is an end view of the rebound member taken substantially along section line 4—4 of FIGURE 1; and FIGURE 5 is a plan view of the shutter with the rebound member shown adjusted to two different positions for obtaining one of the slower and the slowest shutter speeds which are possible.

For purposes of the present invention, the phrase "center of percussion" is defined by the following formulae:

$$d = \frac{(K_{ar})^2}{\bar{r}}$$

or $$d = \frac{I_g}{M\bar{r}} + \bar{r}$$

where:

$d$ = distance to center of percussion from the axis of rotation of the shutter blade.
$\bar{r}$ = distance to center of gravity of shutter blade from the axis of rotation of the shutter blade.
$K_{ar}$ = radius of gyration about the axis of rotation for the shutter blade.
$I_g$ = moment of inertia of this shutter blade about its center of gravity.
$M$ = mass of blade.

Some of these dimensions and loci are shown in FIGURE 3 illustrating the shutter blade and its pivoted mounting.

Generally speaking, the shutter of the present invention, which may be self-setting or may be reset manually or by actuation of a film advance as is well known, comprises a pivoted single shutter blade which is adapted to be struck and moved to a shutter open position by a spring actuated impact lever when the latter is released by a trigger. The impact lever disengages the shutter blade before the blade reaches its full open position which may be determined by an adjustable rebound stop that the blade ultimately comes to rest against during its opening movement, or which open position may be determined by a light return spring acting to hold the shutter in its normal closed position being sufficiently tensioned to reverse the direction of movement of the shutter if the rebound stop is adjusted so as not to be engaged by the shutter blade before this occurs. The present invention concerns designing and arranging the shutter blade and its driving means so as to obtain the most efficient transfer of energy from the impact member and/or rebound member to the shutter blade to the end that (1) higher shutter speeds than heretofore possible with simple impact type shutters are possible, (2) these high shutter speeds can be obtained without increasing the size and/or strength of the impact and/or rebound mechanisms, and (3) these ends can be achieved while at the same time eliminating, or substantially reducing, the shock to which the camera is subjected upon operation of the shutter, said shock tending to produce an undesirable camera movement during the exposure. This efficient transfer of energy is accomplished by so arranging the shutter blade, the impact member and/or the rebound member relative to one another so that the forces applied to the shutter blade by one or both of said impact and rebound members act along a line which passes through the center of percussion of the shutter blade.

Figure 2:
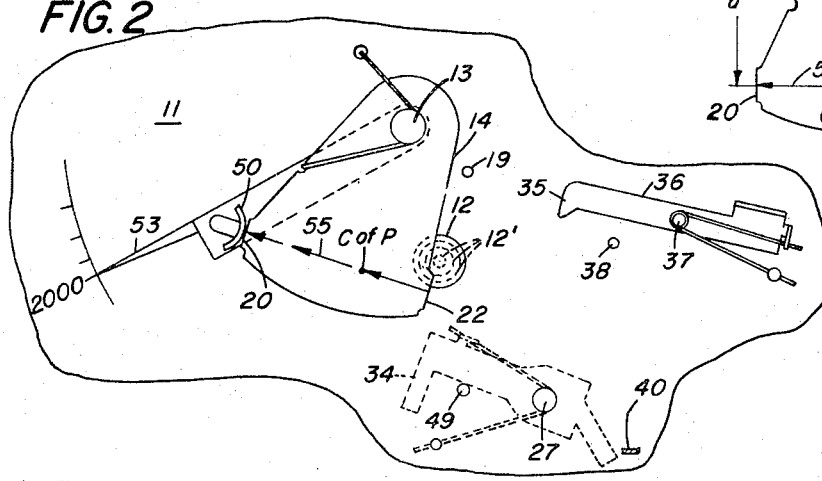
FIGURE 2 represents a plan view of the shutter of FIGURE 1 in its open position; when the rebound member is set for the fastest shutter speed.

This shutter comprises a supporting plate 11 which has a lens aperture 12 extending therethrough which will be in optical alignment with the camera objective, not shown, when the plate is mounted in known fashion at the front of a camera body, not shown. A plurality of concentric exposure apertures 12' are shown because the lens aperture may be defined by any known type of adjustable diaphragm mechanism, e.g., Waterhouse stop, multi-blade diaphragm, etc., not shown, by means of which apertures all of the way from $f/16$ to $f/2.8$, or larger can be obtained. Pivotally mounted on a stud 13 extending from the supporting plate 11 is a shutter blade 14 which is adapted to oscillate between a normal closed position, shown in FIGURE 1, and a selected one of a plurality of open positions, one of which is shown in FIGURE 2, wherein it uncovers the lens aperture. As is well known, the time the blade remains in its open position before returning to its closed position determines the exposure time. While I have shown a solid shutter blade which is moved to and from covering relation with the selected lens aperture it will be understood that this blade could be one of the type which has an arcuate opening therein which is moved to and from alignment with the exposure aperture to make an exposure. Accordingly, when a shutter blade is referred to in this specification and the claims at the end thereof it is meant to cover either of these shutter blade modifications.

The shutter blade 14 is normally moved counterclockwise to its closed position by a light return spring 15 wrapped around the pivot stud 13 and having one end 16 anchored in a hole in the supporting plate 11 and the other end 17 turned inwardly toward the shutter blade and engaging a notch 18 in the edge thereof. A stop pin 19 engages the rear edge of the shutter to locate the shutter in its closed position. The leading edge of the shutter blade has formed integrally therewith a stop lug 20 which preferably lies in the plane of the shutter blade. The trailing edge 21 of the shutter blade has a straight portion 22 which extends substantially vertically when the shutter is in its closed position and constitutes a drive lug for the shutter.

The driving mechanism for the shutter blade 14 comprises an impact member in the form of a lever 26 pivoted on stud 27 and loaded by a drive spring 28 which is wrapped around the stud 27 and has one end 29 anchored to the supporting plate 11 and the other end lying behind a lug 3 turned up from the lever 26. The shutter blade can be cocked either manually or by the film advancing mechanism of a camera, as is well known by engaging the setting arm 32 on the drive lever and moving it to the left, see FIGURE 1, until the leading end 33 of the hammer 34 on the end of the drive lever drops behind the latch member 35 of the trigger 36 pivoted at 37 and spring loaded in a counterclockwise direction against a stop pin 38 by spring 39. This moves the drive lever 26 clockwise about its pivot 27 and tensions the drive spring 28, and this setting action can be accomplished by a lever 40, which is movably connected to the camera body of which this shutter forms a part, and is arranged so as to be moved manually or by the film advancing mechanism. In order to permit the drive lever 26 to be moved to the cocked or latched position shown in FIGURE 1, from its inoperative position, shown dotted in FIGURE 2, after the shutter blade is reclosed, the edge of the shutter blade and/or the rear end of the hammer 34 of the drive lever is made in the form of an inclined ramp to permit the hammer end of the drive lever to move up and over the shutter and the latch member 35 of the trigger during cocking of the shutter as is well known in the shutter art. It is further pointed out that while I have shown the shutter as being one of the setting type it could just as well be one of the automatic or self-setting type wherein the drive spring is cocked by the initial movement of the trigger and is then released as the trigger slips off the setting member, all as is well known in the shutter art.

Assuming the parts to be in the position shown in full lines of FIGURE 1, wherein the shutter is in a cocked condition, an exposure is made by pressing down on the end 45 of the trigger which causes the latch member 35 of the trigger to clear the hammer 34 of the drive lever. The drive lever is now free to rotate counterclockwise about its pivot stud 27 under the action of the relatively strong drive spring 28. At the start of the rotation the leading end of the hammer 34 strikes the drive lug 22 of the shutter blade a sharp blow causing the blade to rotate in a clockwise direction, about its pivot stud 13. The drive lever 26 continues to drive the blade 14 until the latter is clear of the selected exposure aperture 12 or 12'. At this point the end of the drive lever leaves the shutter blade and continues on until it comes to rest against the stop 49 on the supporting plate. The shutter blade continues to rotate until it is stopped by stop lug 20 on the leading edge thereof engaging a rebound member 50 whereupon the direction of movement of the shutter is reversed and it moves back to its normal closed position. The rebound member 50 is preferably somewhat resilient or elastic and is connected by member 51 to a speed adjusting lever 52 having a pointer 53 movable over a shutter speed scale 54.

Since the elapsed time between when the shutter blade 14 uncovers the selected exposure aperture and when it returns to its normal closed position determines the speed of the exposure, it will be understood that by changing the position of the rebound member 50 the shutter speed can be varied. In other words, the fastest shutter speed will be achieved when the rebound stop 50 is adjusted to engage the shutter blade the instant it has just uncovered the smallest possible exposure aperture in 12', see FIGURE 2. As the rebound member is moved further and further from this position, slower and slower speeds will be obtained until the slowest instantaneous speed will be obtained when the rebound member is moved just beyond the reach of the opening movement of the shutter blade, see full-time position of adjusting lever 52 in FIGURE 5. At this time the shutter speed will depend upon the strength of the light return spring because the shutter will move in its opening direction until the return spring is sufficiently tensioned to reverse the movement of the blade.

As stated at the outset, the main object of this invention is achieved by transferring energy from the impact or driving member and/or the rebound member to the shutter blade 14 in the most efficient manner. To this end, the parts are so arranged that the force of impact imposed on the shutter blade by the impact or driving member will pass through the center of percussion of the blade. The center of percussion of the shutter blade may be defined as the inertial center of the blade or the point through which a striking force can be applied to the blade at right angles to the plane passing through this point and the axis of rotation of the blade without imposing a horizontal reaction on the pivotal bearing of the blade. This point is determined by the two formulae given above. Some of the values to be used with the formulae are shown in FIGURE 3. The distance $r$ is the distance from the axis of rotation of the blade to the center of gravity, C of G, of the blade. The distance to the center of percussion, the distance, $d$, to be determined, is also taken from the axis of rotation. For the particular type of blade shown the center of percussion is located just below the center of gravity and is designated C of P in FIGURES 1 and 2. The location of this point will, of course, vary with the type of blade used and its mounting. The radius of gyration about the axis of rotation ($K_{ar}$) is equal to $$\frac{\sqrt{I_{ar}}}{M}$$

The other values have previously been explained.

Referring to FIGURE 1, wherein the position of the impact member at the moment of contact with the shutter blade is shown in dotted lines, it will be noted that at the moment of contact the longitudinal axis of the impact lever 26 is substantially parallel to the line between the axis of rotation of the blade and the center of gravity. Thus, the direction of the impact force, shown by arrows 55 when passing through the center of percussion, C of P, of the blade is perpendicular to the line from the axis of rotation to the center of gravity. An optimum transfer of energy occurs under these conditions since essentially no horizontal reaction is produced on the pivotal bearing 13 of the blade 14. One result of this is that little or no shock is transmitted to the camera by this shutter driving impact to cause camera movement during the exposure. Another result is that faster shutter speeds can be achieved with this simple type of shutter than has heretofore been possible. I have found that it is possible to obtain shutter speeds as high as ½₀₀₀ sec. with an f/11 lens having a focal length of the order of 50 mm. using a shutter modified in accordance with this invention. Even if such high shutter speeds are not desired, this invention permits normal shutter speeds to be obtained using a less strong impact mechanism than is conventionally used and/or permits a stronger and heavier shutter blade to be used with an impact mechanism or conventional power.

In order to obtain the most efficient transfer of energy from the rebound member to the shutter blade the edge of the stop lug 20 on the leading edge of the blade extends substantially parallel to the driving lug 22 of the shutter and is so located relative to the center of percussion, C of P, of the blade that a force applied perpendicular thereto upon hitting the rebound member 50 passes through, or substantially through, the center of percussion of the blade. This result is obtained by mounting the rebound member 50 on the adjusting lever 52 which is pivoted on the same axis 13 as the shutter blade and at a distance from said axis which is equal to the distance from this axis to the center of percussion of the blade. Accordingly, in any position of speed adjustment of lever 52 the rebound member will apply a force to the stop lug 20 that will pass through the center of percussion of the blade and substantially at a right angle to a line passing through the axis 13 and the C of G of the blade, see FIGURE 2.

With this type of shutter the length of exposure varies in direct proportion to the distance the shutter blade travels after it is struck by the impact member and until it strikes the rebound member to be returned to its closed position. Accordingly, the fastest shutter speed possible, e.g. ½₀₀₀ sec., is achieved if the rebound member is located to strike the stop lug 20 at the instant the blade completely uncovers the smallest exposure aperture, 12' possible (f/11 in this instance) see FIGURE 2. As the lever 52 is adjusted over speed scale 54 in a clockwise direction, the rebound member 50 is moved further and further from the stop lug 20 on the shutter to obtain slower and slower speeds. As mentioned above the slowest instantaneous speed will be obtained when rebound member 50 is moved just out of range of movement of the shutter blade so that the return of the blade to its closed position will depend upon its return spring 15 being tensioned sufficiently to reverse its direction and return it to its closed position, see solid line position of adjusting lever 52 in FIGURE 5.

While I have specified the rebound member 50 as being elastic this rebound member could be rigid and function in the same manner, except at the highest speeds mentioned. Also, under certain conditions, e.g., where gravity will tend to return the blade to its normal closed position, the light return spring 15 may be eliminated if there is provided a suitable latch e.g. magnet or friction, to grab and hold the shutter as it returns to its closed position as is well known in the art.

Since in a shutter constructed in accordance with the present invention the direction of force applied to the shutter blade passes through the center of percussion of the blade, the desired objects are achieved. Higher shutter speeds than heretofore possible may be obtained using a simple pivoted blade shutter. The camera is subjected to a minimum of shock resulting from the impact of the impact member and/or rebound member striking the shutter blade. Relatively light spring members and/or impact members or more durable shutter blades may be used in this type of impact shutter without the disadvantages that would normally flow from the use of such arrangements.

Although the foregoing description relates to a specific embodiment of the invention, it is obvious that variations and modifications thereof can be effected within the spirit and scope of the invention. Accordingly, the present disclosure is to be considered as illustrative and not as limiting the scope of the invention which is defined by the following claims.

I claim:

1. A shutter for a photographic device having an exposure aperture; and comprising, a shutter blade pivotally mounted to oscillate from a normal closed position covering said exposure aperture to at least one open position, where it uncovers said aperture, said blade having a center of gravity spaced a distance $\bar{r}$ radially from its pivot point; means including an impact member for applying a sharp impact to said shutter blade to impart a rotary motion thereto and move it from said normal closed position; and a rebound stop member positioned in the path of movement of said blade at a point arcuately spaced from said normal position to be engaged by said shutter blade for applying a reversing impulse thereto to return it to said normal position; said impact member and said rebound member being so mounted as to engage said shutter blade for only a small portion of the total travel thereof and at points spaced radially from the pivot point of said blade by a distance $d$ substantially equal to $$\frac{(K_{ar})^2}{\bar{r}} \text{ or } \frac{I_g}{M\bar{r}} + \bar{r}$$

where:

$K_{ar}$ = radius of gyration of the blade about its axis of rotation.

$L_g$ = moment of inertia of the blade about its center of gravity.

$M$ = mass of the blade.

2. A shutter according to claim 1 in which said impact member and said rebound member are arranged to exert a driving force on said shutter blade in a direction substantially normal to a radial plane passing through the pivot point and center of gravity of said blade.

3. A shutter according to claim 2 which comprises means for movably mounting said rebound member and operative to locate said rebound member at any one of a plurality of positions arcuately spaced along the path of movement of said shutter blade relative to said normal position to control the total travel of said shutter blade and hence the time of exposure.

4. A shutter according to claim 2 which comprises a return spring normally biasing said shutter blade to said normal position and which is tensioned as said shutter blade is moved from said normal position by said impact member and will ultimately reverse the direction of said shutter blade and return it to its normal position after the shutter blade has moved arcuately from said normal position by a maximum amount to produce a slow exposure; and means for movably mounting said rebound member in the path of movement of said blade at different positions arcuately spaced along the path of movement of said blade relative to said normal position to limit the travel of the shutter to less than said maximum amount to produce shutter speeds faster than said slow exposure.

5. A shutter for a photographic device having an exposure aperture and comprising a shutter blade pivoted to move from a normal position covering said exposure aperture to at least one position wherein it uncovers said aperture, said blade having a center of gravity spaced a distance $\bar{r}$ radially from its pivot points; a return spring normally biasing said shutter blade to said normal position; means inlcuding an impact member for applying a sharp impulse to said shutter blade to impart a rotary motion thereto and move it from said normal position, said impact member being so arranged as to engage said shutter blade for only a small portion of the total travel thereof and at a point spaced radially of the pivot point of said bade by a distance $d$ substantially equal to $$\frac{(K_{ar})^2}{\bar{r}} \text{ or } \frac{I_g}{M\bar{r}} + \bar{r}$$

where:

$K_{ar}$=radius of gyration of the shutter blade about its pivot point.
$I_g$=moment of inertia of the shutter blade about its center of gravity.
$M$=mass of the shutter blade.

References Cited
UNITED STATES PATENTS 3,081,683  3/1963  Horton _____ 95—59

JOHN M. HORAN, *Primary Examiner.*